United States Patent
Erasala et al.

(10) Patent No.: US 11,878,655 B2
(45) Date of Patent: Jan. 23, 2024

(54) VEHICLE STEP BAR

(71) Applicant: Ford Global Technologies, LLC, Dearborn, MI (US)

(72) Inventors: Shekar Prabhakar Erasala, Northville, MI (US); Sino Johan Van Dyk, Plymouth, MI (US); Abdelmonaam Sassi, Windsor (CA); Joseph E. Abramczyk, Farmington Hills, MI (US); Jamil M. Alwan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 17/229,952

(22) Filed: Apr. 14, 2021

(65) Prior Publication Data
US 2022/0332252 A1     Oct. 20, 2022

(51) Int. Cl.
| B60R 3/02 | (2006.01) |
| B62D 25/04 | (2006.01) |
| B62D 25/02 | (2006.01) |

(52) U.S. Cl.
CPC ............. B60R 3/02 (2013.01); B62D 25/025 (2013.01); B62D 25/04 (2013.01)

(58) Field of Classification Search
CPC .. B60R 3/02; B60R 3/002; B60R 3/00; B60R 2013/046; B62D 25/025; B62D 25/04; B60J 5/0479; B60J 5/06
See application file for complete search history.

(56) References Cited

U.S. PATENT DOCUMENTS

| 2,756,085 A | * | 7/1956 | Frederick, I | ............ E05B 83/24 292/108 |
| 2,793,061 A | * | 5/1957 | Dall | ......................... E05B 83/24 292/6 |
| 2,877,035 A | * | 3/1959 | Claud-Mantle | ......... E05B 83/24 292/306 |
| 3,454,299 A | * | 7/1969 | Hewitt | ............... B62D 33/0273 296/57.1 |
| 7,441,790 B2 | * | 10/2008 | Lechkun | ................... B60R 3/02 280/166 |
| 7,513,565 B2 | * | 4/2009 | Watson | ..................... B60R 3/02 280/166 |

(Continued)

FOREIGN PATENT DOCUMENTS

| DE | 102020213182 A1 | * | 4/2022 | ............ A61G 3/062 |
| EP | 3566905 B1 | * | 9/2020 | |

(Continued)

*Primary Examiner* — James A Shriver, II
*Assistant Examiner* — Michael T. Walsh
(74) *Attorney, Agent, or Firm* — Frank A. Mackenzie; Bejin Bieneman PLC (57) ABSTRACT

A vehicle includes a vehicle body including a front pillar and a rear pillar spaced from the front pillar. The vehicle body includes a rocker extending from the front pillar to the rear pillar. The vehicle includes a step bar supported by the rocker. The step bar extends from a first end aligned with the front pillar to a second end aligned with the rear pillar. The step bar is movable between a raised position and a lowered position. In the raised position, the step bar overlaps the rocker in a vehicle-outboard direction. The step bar extends upwardly above the rocker.

20 Claims, 6 Drawing Sheets

(56) References Cited

U.S. PATENT DOCUMENTS

| | | | | |
|---|---|---|---|---|
| 8,231,149 | B1 * | 7/2012 | Shelby | E05B 83/243 |
| | | | | 292/202 |
| 10,576,879 | B1 * | 3/2020 | Salter | B60Q 1/325 |
| 2005/0110236 | A1 * | 5/2005 | Stevenson | B60R 3/02 |
| | | | | 280/163 |
| 2006/0001288 | A1 * | 1/2006 | Thiele | E05D 7/1061 |
| | | | | 296/50 |
| 2008/0061566 | A1 * | 3/2008 | Ryan | B60R 19/38 |
| | | | | 293/118 |
| 2008/0179920 | A1 * | 7/2008 | Watson | B60R 3/002 |
| | | | | 296/209 |
| 2009/0184485 | A1 | 7/2009 | Castillo et al. | |
| 2015/0291116 | A1 | 10/2015 | Pi | |
| 2020/0223490 | A1 | 7/2020 | Min et al. | |
| 2020/0398760 | A1 * | 12/2020 | Yake | B60R 3/02 |
| 2023/0016866 | A1 * | 1/2023 | Ottino | E05B 81/04 |

FOREIGN PATENT DOCUMENTS

| | | | | |
|---|---|---|---|---|
| EP | 3566905 | B1 | 9/2020 | |
| EP | 3929383 | A1 * | 12/2021 | B62D 25/12 |
| GB | 2579381 | A * | 6/2020 | B60J 5/0459 |
| GB | 2579381 | A | 6/2020 | |
| JP | H09273340 | A * | 10/1997 | |
| WO | WO-03066380 | A1 * | 8/2003 | B60R 3/002 |

* cited by examiner

VEHICLE STEP BAR

BACKGROUND

A vehicle may include amenities that allow occupants to ingress and egress the vehicle. As one example, a vehicle includes a step bar that moves from a raised position to a lowered position to assist occupants in entering and exiting the vehicle.

DETAILED DESCRIPTION

A vehicle includes a vehicle body including a front pillar and a rear pillar spaced from the front pillar. The vehicle body includes a rocker extending from the front pillar to the rear pillar. The vehicle includes a step bar supported by the rocker. The step bar extends from a first end aligned with the front pillar to a second end aligned with the rear pillar. The step bar is movable between a raised position and a lowered position. In the raised position, the step bar overlaps the rocker in a vehicle-outboard direction. The step bar extends upwardly above the rocker.

The vehicle may include a door slidably supported by the vehicle body and movable from an open position to a closed position, the step bar overlapping the door in the vehicle-outboard direction when the door is in the closed position and the step bar is in the raised position.

The vehicle may include a second door slidably supported by the vehicle body adjacent the door and movable from an open position to a closed position, the step bar overlapping the second door in the vehicle-outboard direction when the door and the second door are in the closed positions and the step bar is in the raised position.

The vehicle body may define an opening extending uninterrupted from the front pillar to the rear pillar, the door and the second door being in the opening in the closed positions.

The vehicle may include a computer including a processor and memory storing instructions executable by the processor to move the step bar from the raised position to the lowered position when the door moves to the open position.

The memory may store instructions executable by the processor to move the step bar from the lowered position to the raised position when the door moves to the closed position.

The vehicle may include a computer including a processor and memory storing instructions executable by the processor to move the step bar from the lowered position to the raised position when the door moves to the closed position.

The vehicle may include a pin fixed to the step bar and engageable with the vehicle body in the raised position.

The pin may be engageable with one of the front pillar or the rear pillar.

The pin may extend in a vehicle-inboard direction from the step bar in the raised position.

The vehicle may include a first pin fixed to the step bar at the first end of the step bar and a second pin fixed to the step bar at the second end of the step bar, the first pin being engageable with the front pillar and the second pin being engageable with the rear pillar in the raised position.

The step bar may include a stepping surface facing upwardly when the step bar is in the lowered position and facing vehicle-inboard when the step bar is in the raised position.

The step bar may define a class-A surface opposite the stepping surface, the class-A surface facing the vehicle-outboard direction in the raised position.

The vehicle may include an arm extending from the step bar to the rocker, the arm being rotatably coupled to at least one of the rocker and the step bar.

The step bar may be rotatable relative to the rocker from the raised position to the lowered position.

The step bar may be elongated along a vehicle-longitudinal axis.

The step bar may extend vertically a first distance in the raised position and in the vehicle-outboard direction a second distance in the raised position, the first distance being greater than the second distance.

The vehicle body may define an opening extending uninterrupted from the front pillar to the rear pillar.

With reference to the Figures, wherein like numerals indicate like parts throughout the several views, a vehicle 10 includes a vehicle body 12 including a front pillar 14 and a rear pillar 16 spaced from the front pillar 14. The vehicle body 12 includes a rocker 18 extending from the front pillar 14 to the rear pillar 16. The vehicle 10 includes a step bar 20 supported by the rocker 18. The step bar 20 extends from a first end 22 aligned with the front pillar 14 to a second end 24 aligned with the rear pillar 16. The step bar 20 is movable between a raised position and a lowered position. In the raised position, the step bar 20 overlaps the rocker 18 in a vehicle-outboard direction. The step bar 20 extends upwardly above the rocker 18.

Since the step bar 20 of the vehicle 10 overlaps the rocker 18, the step bar 20 provides structural reinforcement to the vehicle body 12. Specifically, in the event of certain side impacts, the step bar 20 distributes loads to the rocker 18, the front pillar 14, and the rear pillar 16. In one example, such as the example shown in the figures, the vehicle 10 may include no middle pillar between the front pillar 14 and the rear pillar 16. In such an example, the step bar 20 reinforces the area between the front pillar 14 and the rear pillar 16 to reduce intrusion during certain side impacts by delivering the forces to the rocker 18, the front pillar 14, and the rear pillar 16.

Figure 1:
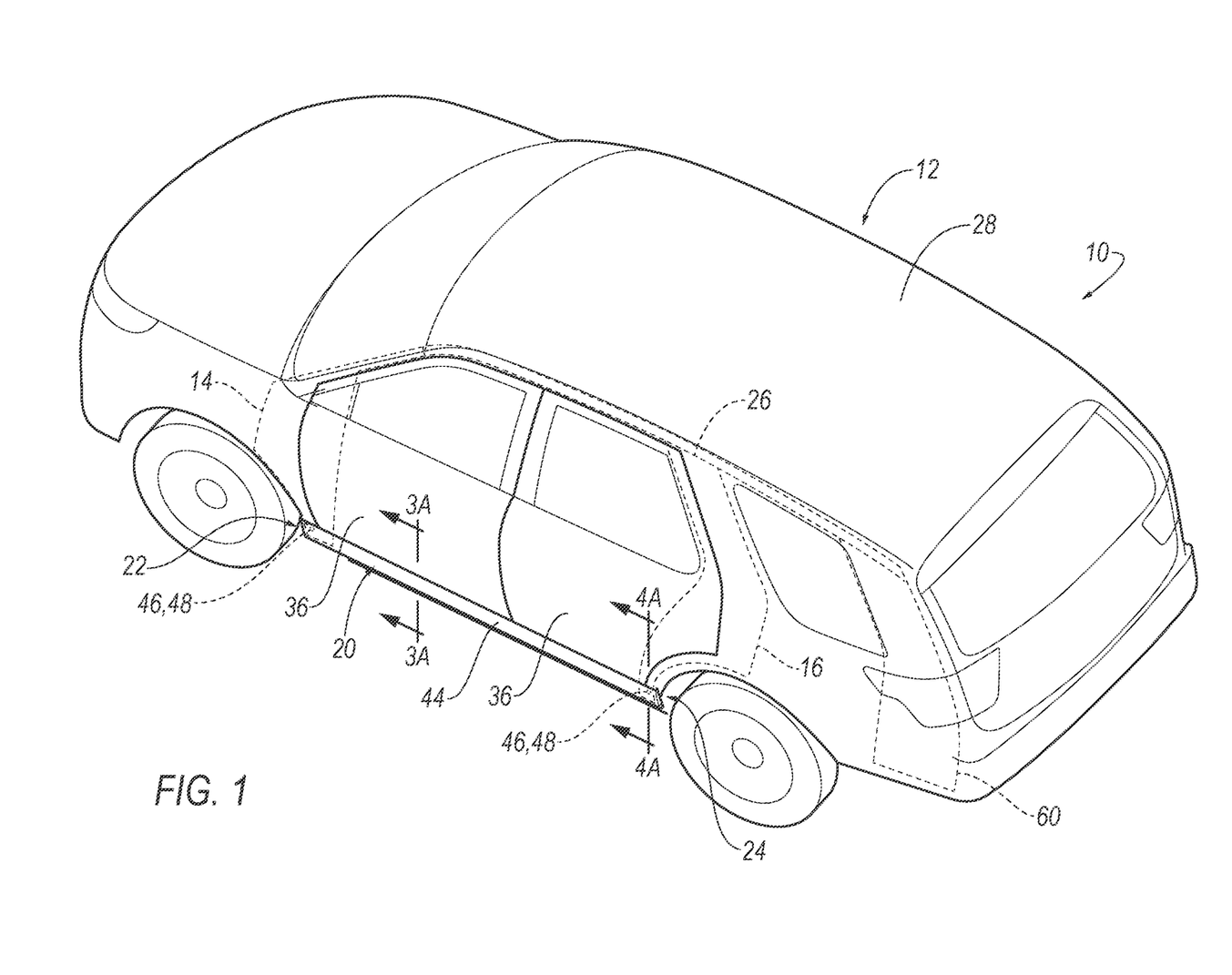
FIG. 1 is a perspective view of a vehicle having a step bar in a raised position and doors in a closed position.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

The vehicle 10 includes a vehicle frame (not numbered) and the vehicle body 12. The vehicle frame and the vehicle body 12 may be of a unibody construction in which the frame is unitary with a vehicle body 12 (including frame rails, pillars 14, 16, roof rails 26, etc.). As another example, the vehicle body 12 and vehicle frame may have a body-on-frame construction (also referred to as a cab-on-frame construction) in which the vehicle body 12 and frame are separate components, i.e., are modular, and the vehicle body 12 is supported on and affixed to the frame. Alternatively, the vehicle frame and vehicle body 12 may have any suitable construction. The vehicle frame and vehicle body 12 may be of any suitable material, for example, steel, aluminum, and/or fiber-reinforced plastic, etc.

The vehicle body 12 may define a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

With continued reference to FIG. 1, the vehicle body 12 includes two roof rails 26. The roof rails 26 are spaced from one another in a cross-vehicle direction. The roof rails 26 each extend longitudinally along the vehicle body 12, i.e., along a vehicle-longitudinal axis.

The vehicle body 12 includes one or more roof bows (not shown) extending between the roof rails 26. The roof bows are spaced from one another in a vehicle fore-and-aft direction. The roof bows extend from one roof rail 26 to the other roof rail 26. Both roof bows may be irremovably fixed to both roof rails 26. In other words, the roof bows are secured to the roof fails in such a way that removal requires destruction such as cutting, e.g., cutting material and/or welded joints, etc. As an example, the roof bows may be attached to both roof rails 26, e.g., by welding, fasteners, etc. The vehicle body 12 may include any suitable roof bows spaced from one another and extending from one roof rail 26 to the other roof rail 26.

The vehicle body 12 includes a vehicle roof 28. The vehicle roof 28 may define the upper boundary of the passenger compartment and may extend from the front end of the passenger compartment to the rear end of the passenger compartment. The vehicle roof 28 may extend from one roof rail 26 to the other roof rail 26. The vehicle roof 28 may be irremovably fixed to the roof rails 26. In other words, the vehicle roof 28 is secured to the roof fails in such a way that removal requires destruction such as cutting, e.g., cutting material and/or welded joints, etc. As an example, the vehicle roof 28 may be attached to both roof rails 26, e.g., by welding, fasteners, etc., and may be supported by the roof bows.

With continued reference to FIG. 1, the vehicle body 12 includes the vehicle floor 30 spaced downwardly from the vehicle roof 28. The vehicle floor 30 may define the lower boundary of the passenger compartment and may extend from the front end of the passenger compartment to the rear end of the passenger compartment. The vehicle floor 30 may include a floor panel and upholstery on the vehicle floor 30. The upholstery may be, for example, carpet, and may have a class-A surface facing the passenger compartment, i.e., a surface specifically manufactured to have a high quality, finished, aesthetic appearance free of blemishes. The vehicle floor 30 may include cross-beams (not shown) connected to the floor panel and to other components of the vehicle body 12.

The vehicle body 12 may include pillars 14, 16 spaced from each along the vehicle-longitudinal axis on both sides of the vehicle body 12. Specifically, the vehicle body 12 includes the front pillar 14 and the rear pillar 16 spaced vehicle-rearward from the front pillar 14 on each side of the vehicle body 12. For example, the vehicle body 12 includes an A-pillar 14 and a C-pillar 16 on each side of the vehicle 10 with the A-pillar 14 being spaced from the C-pillar 16. In other words, the A-pillars 14 may be disposed at the front end of the passenger compartment. The pillars 14, 16 may extend from the vehicle roof 28 to the vehicle floor 30. The vehicle 10 may include other pillars. For example, as shown in the Figures, the vehicle 10 may include a D-pillar 60 disposed at the rear end of the passenger compartment on each side of the vehicle 10.

Figure 2:
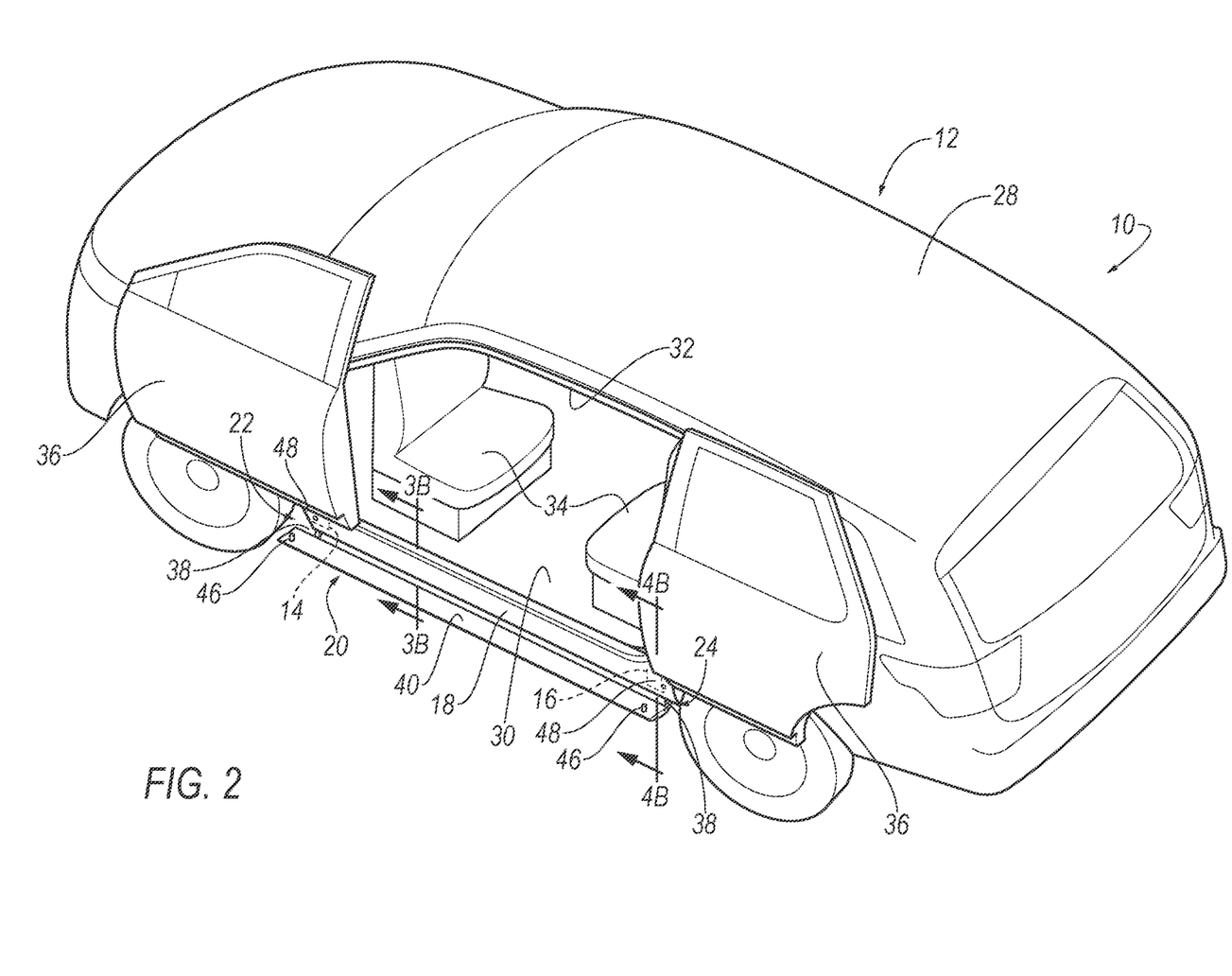
FIG. 2 is a perspective view of the vehicle with the step bar in the lowered position and doors in an open position.
Figure 3A:
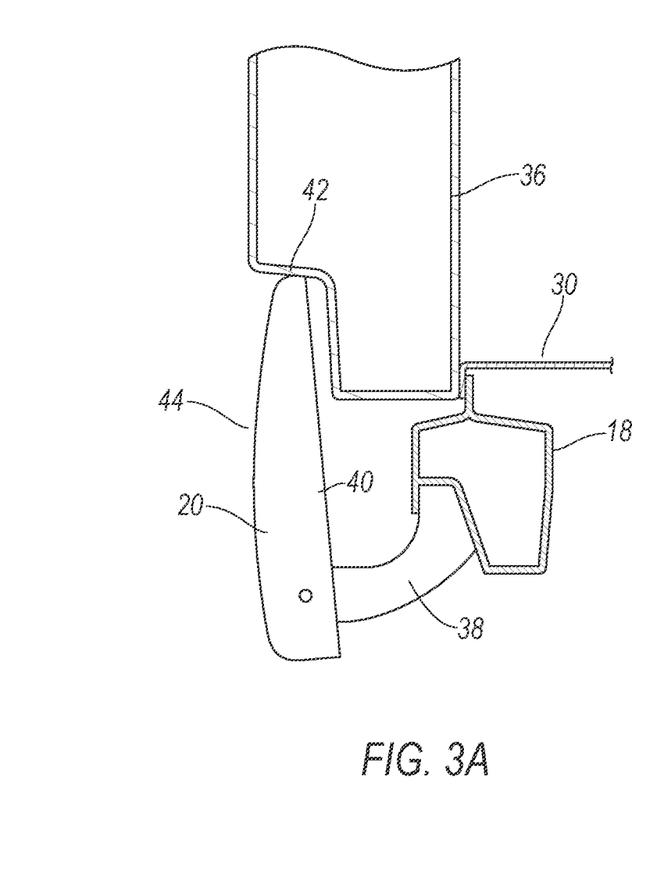
FIG. 3A is a cross-sectional view through line 3A of FIG. 1.
Figure 3B:
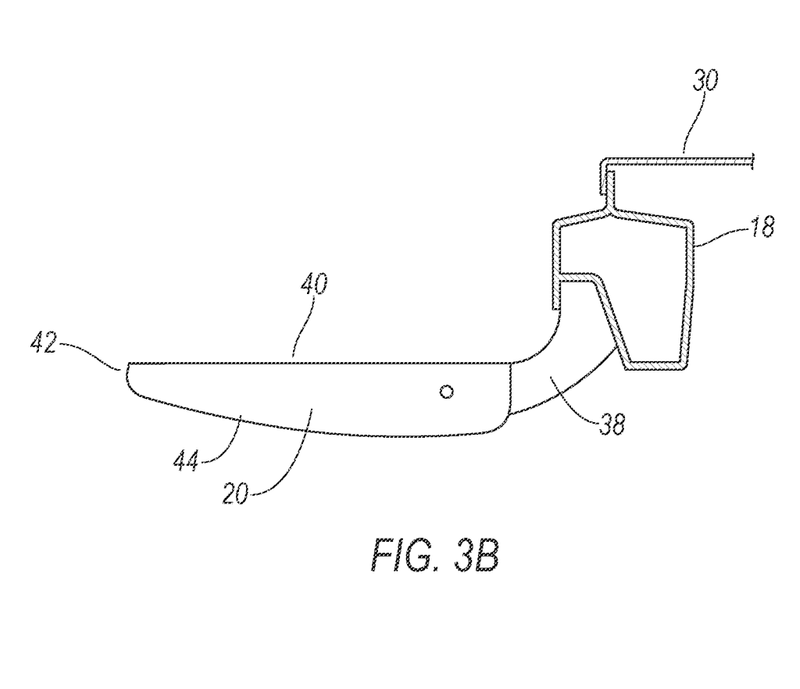
FIG. 3B is a cross-sectional view through line 3B of FIG. 2.

With reference to FIGS. 2-3B, the vehicle body 12 includes rockers 18 extending from the front pillar 14 to the rear pillar 16, e.g., from the A-pillar 14 to the C-pillar 16. Specifically, the vehicle body 12 may include two rockers 18, one on each side of the vehicle body 12. The rockers 18 are elongated along the vehicle-longitudinal axis. The vehicle 10 may include two rockers 18, i.e., one rocker 18 on either side of the passenger compartment. The rockers 18 are spaced from the roof rails 26 below the roof rails 26. The rockers 18 are below the passenger compartment. In some examples, the rockers 18 may be connected to the pillars 14, 16 in any suitable way, e.g., welding, adhesive, fasteners, etc. In other words, in such examples, the rockers 18 and the pillars 14, 16 are separate from each other and connected to each other. In other examples, the rockers 18 may be unitary with the pillars 14, 16, i.e., a single, uniform piece of material with no seams, joints, fasteners, or adhesives holding it together. In such an example, the pillars 14, 16 and the rocker 18 may be formed together simultaneously as a single continuous unit, e.g., by molding, forging, casting, stamping, etc.

The vehicle body 12 may define an opening 32. Specifically, the vehicle body 12 may include one or more opening 32 between pillars 14, 16 of the vehicle body 12. The opening 32 may be between the front pillar 14 and the rear pillar 16, e.g., between the A-pillar 14 and the C-pillar 16, and between the rocker 18 and the roof rail 26. In other words, the pillars 14, 16 are spaced from each other by the opening 32 and the roof rail 26 and rocker 18 are spaced from each other by the opening 32. The opening 32 extends uninterrupted from the front pillar 14 to the rear pillar 16. The opening 32 extends uninterrupted from the rocker 18 to the roof rails 26. The opening 32 allows for ingress and egress into the passenger compartment. The vehicle 10 may include any suitable number of openings 32 to allow for ingress and egress into the passenger compartment. For example, as shown in the Figures, the vehicle 10 may include an opening 32 on each side of the vehicle 10. In other examples, the vehicle 10 may include multiple openings 32 on each side of the vehicle 10.

With reference to FIG. 2, the vehicle body 12 may not include a middle pillar between the front pillar 14 and the rear pillar 16, i.e., the vehicle body 12 may not include a B-pillar between the A-pillar 14 and the C-pillar 16. The vehicle body 12 lacking a middle pillar allows for the opening 32 to extend from the front pillar 14 to the rear pillar 16. The opening 32 extending from the front pillar 14 to the rear pillar 16 allows occupants easier access to the passenger compartment for ingress and egress.

The vehicle 10 may include one or more seats 34. Specifically, the vehicle 10 may include any suitable number of seats 34. The seats 34 are supported by the vehicle floor 30. The seats 34 may be arranged in any suitable arrangement in the passenger compartment. As in the example shown in the Figures, one or more of the seats 34 may be at the front end of the passenger compartment, e.g., a driver seat and/or a passenger seat. In other examples, one or more of the seats 34 may be behind the front end of the passenger compartment, e.g., at the rear end of the passenger compartment. The seats 34 may be movable relative to the vehicle floor 30 to various positions, e.g., movable fore-and-aft and/or cross-vehicle. The seat 34 may be of any suitable type, e.g., a bucket seat. The seats 34 may be adjacent the openings 32 in the vehicle body 12.

With reference to FIGS. 1-3B, the vehicle 10 includes a plurality of doors 36, e.g., a first door 36 and a second door 36 on each side of the vehicle body 12, openable from a closed position to an open position for vehicle occupants to enter and exit a passenger compartment. In the closed position, the doors 36 are in at least one of the openings 32 in the vehicle body 12. In the example shown in the figures, the first door 36 and the second door 36 are both in the single opening 32 in the vehicle body 12. In the open position, at least one of the openings 32 in the vehicle body 12 may be exposed. Each of the doors 36 are adjacent a seat 34 in the vehicle 10. Each of the front seats 34 and each of the rear seats 34 may be adjacent a door 36 of the vehicle 10. Specifically, each front seat 34 may be adjacent a front door 36 and each rear seat 34 may be adjacent a rear door 36. The doors 36 are vehicle-outboard from each of the front seats 34 and each of the rear seats 34.

As shown in the example in the Figures, the doors 36 may be slidably supported by the vehicle body 12. For example, the vehicle body 12 may include a track with the doors 36 being slidably supported by the track. Each of the doors 36 is movable, i.e., slidable, from the closed position to the open position. In the closed position, the doors 36 on each side of the vehicle 10, i.e., the front door 36 and the rear door 36, are adjacent each other. As the doors 36 move to the open position, the front door 36 moves away from the rear door 36 toward the front end of the passenger compartment and the rear door 36 moves away from the front door 36 toward the rear end of the passenger compartment.

The numerical adverbs "first" and "second" with respect to the doors 36 are used herein merely as identifiers and do not signify order or importance. The terms "first" and "second" may be used interchangeably when referring to the doors 36 as shown in the Figures.

The roof rails 26 contact a top edge of the doors 36 when the doors 36 are in the closed position. Each door 36 includes at least one door panel (not numbered) and a door-trim panel (not shown) supported on the door panel. Specifically, the door may include two panels, namely a door inner (not shown) and a door outer (not numbered). In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The door includes a window opening (not numbered) that may be completely closed by a window (not numbered) when the window is in a fully raised position. The window opening is defined by the door-trim panel and door outer on a bottom edge and either by the door inner circumscribing the window opening or by the vehicle body 12, e.g., the A pillar, the B pillar, and the roof rail 26. The door outer faces outboard relative to the vehicle 10.

The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door.

In an example such as shown in the Figures and as discussed above, the vehicle body 12 may not include a middle pillar, e.g., a B-pillar. In such an example, the middle pillar may be integrated into the door 36 adjacent the opening 32 in the vehicle body 12. In other words, when the doors 36 are in the closed position, the middle pillar may be a part of the door panel of each of the doors 36. The middle pillar may be separated when the doors 36 are in the open position. The middle pillar integrated into the door panel provides structure to the vehicle 10 in the event of an impact to the vehicle 10 and the vehicle body 12 does not include a middle pillar.

With reference to FIGS. 1-4B, the vehicle 10 includes the step bar 20 supported by the vehicle body 12 adjacent the doors 36 and the opening 32. Specifically, the step bar 20 is supported by the rocker 18 of the vehicle body 12 adjacent the doors 36 and the opening 32. The step bar 20 may be elongated along the rocker 18 of the vehicle body 12. In other words, the step bar 20 is elongated along the vehicle-longitudinal axis adjacent the rocker 18 of the vehicle body 12. The step bar 20 may be spaced from the rocker 18 in the vehicle-outboard direction.

As shown in FIG. 2-4B, the vehicle body 12 may include arms 38 connecting the step bar 20 to the rocker 18. As in the example shown in the Figures, the step bar 20 may be connected to the rocker 18 by at least one arm 38 extending from the step bar 20 to the rocker 18. Specifically, the vehicle 10 may include two arms 38, as is shown, extending from the step bar 20 to the rocker 18 supporting the step bar 20 by the rocker 18. The step bar 20 may be spaced from the rocker 18 by the arms 38. In another example, the step bar 20 may be connected directly to the rocker 18 of the vehicle 10, i.e., no other components exist between the step bar 20 and the rocker 18. In such an example, the step bar 20 may be hinged directly to the rocker 18 such that the step bar 20 rotates relative to the rocker 18.

The step bar 20 may extend from the first end 22 to the second end 24. In other words, the step bar 20 may be elongated along the rocker 18 from the first end 22 to the second end 24. The first end 22 may be aligned with the front pillar 14, e.g., the A-pillar 14, of the vehicle body 12 and the second end 24 may be aligned with the rear pillar 16, e.g., the C-pillar 16, of the vehicle body 12.

The step bar 20 is movable from the raised position to the lowered position. Specifically, the step bar 20 may be rotatable from the raised position to the lowered position. The step bar 20 may be rotatable relative to the rocker 18 from the raised position to the lowered position. Specifically, at least one of the rocker 18 and the step bar 20 may be rotatably coupled to the arm 38. In other words, as shown in the Figures, the step bar 20 may be rotatable relative to the arm 38 and the rocker 18, i.e., arm 38 is rotatably coupled to the step bar 20. In such an example, the arm 38 may be rotatably fixed relative to the rocker 18, i.e., the arm 38 does not rotate relative to the rocker 18. In other examples, the arm 38 and the step bar 20 may be rotatable relative to the rocker 18, i.e., the arm 38 may be rotatably coupled to the rocker 18. In such an example, the arm 38 may be rotatably fixed relative to the step bar 20, i.e., the arm 38 does not rotate relative to the step bar 20.

With reference to FIGS. 2, the step bar 20 may be in the lowered position when the doors 36 are in the open position. When the step bar 20 is in the lowered position and the doors 36 are in the open position, the step bar 20 is adjacent the opening 32 in the vehicle body 12. In the lowered position, the step bar 20 may be used by occupants of the vehicle 10 for ingress and egress of the passenger compartment of the vehicle 10, i.e., occupants may step on the step bar 20 to provide leverage for ingress and egress of the passenger compartment. Specifically, the step bar 20 includes a stepping surface 40 facing upwardly when the step bar 20 is in the lowered position. An occupant of the vehicle 10 may step on the stepping surface 40 as the occupant ingresses or egresses the vehicle 10. The arms 38 extending from the step bar 20 to the rocker 18 may support the weight of both the step bar 20 and the occupant when the occupant is stepping on the stepping surface 40 to enter the vehicle 10. The step bar 20 may include a tread disposed along the stepping surface 40, e.g., rubber, texture, etc. The tread may aid occupants stepping on the stepping surface 40 to enter or exit the vehicle 10 to limit slipping or movement along the stepping surface 40 during use. The step bar 20 may include any suitable type of tread disposed along the stepping area.

In the lowered position, the step bar 20 extends in the vehicle-outboard direction away from the rocker 18 to a distal end 42. In the example shown in the Figures, in the lowered position, the step bar 20 extends in the vehicle-outboard direction from the arms 38 extending from the rocker 18 to the step bar 20. The distal end 42 of the step bar 20 may be spaced in the vehicle-outboard direction from the arms 38 and the rocker 18 when the step bar 20 is in the lowered position.

With reference to FIGS. 1, 3A, and 3B, the step bar 20 may be in the raised position when the doors 36 are in the closed position. In the raised position, the step bar 20 is adjacent to and overlapping the rocker 18 and the doors 36. Specifically, the step bar 20 overlaps the rocker 18 and doors 36 in the vehicle-outboard direction. The step bar 20 overlapping of the rocker 18 and doors 36 adds thickness to the rocker 18 to manage impact energy in the event of an impact to the vehicle 10. The stepping surface 40 faces the rocker 18 and doors 36 when the step bar 20 is in the raised position. In other words, the stepping surface 40 faces a vehicle-inboard direction when the step bar 20 is in the raised position. In the raised position, the stepping surface 40 may be spaced from the rocker 18 in the vehicle-outboard direction.

Figure 4A:
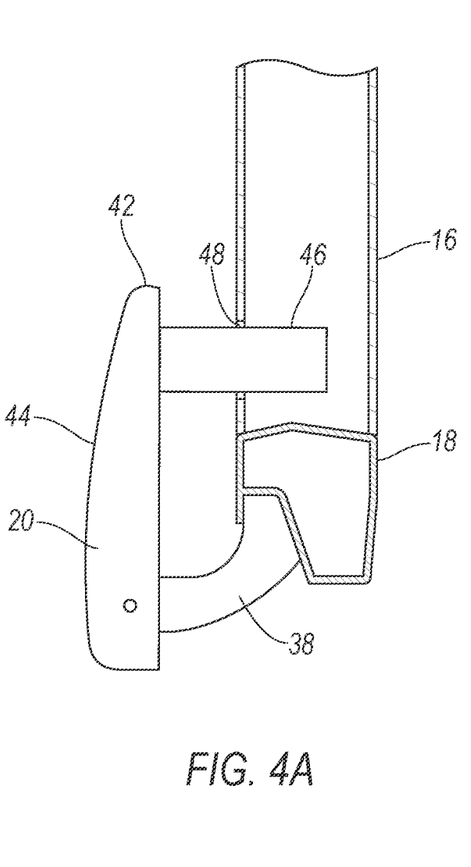
FIG. 4A is a cross-sectional view through line 4A of FIG. 1.

With reference to FIGS. 3A and 4A, in the raised position, the step bar 20 may extend upwardly above the rocker 18 to the distal end 42, i.e., the distal end 42 is vertically higher than the top-most surface of the rocker 18. Specifically, the distal end 42 of the step bar 20 may be adjacent the doors 36 when the step bar 20 is in the raised position. The step bar 20 may extend vertically a first distance toward the doors 36. In an example as shown in the figures, the step bar 20 may extend upwardly from the arms 38 toward the doors 36. The step bar 20 may extend in the vehicle-outboard direction a second distance. Specifically, the step bar 20 extends in the vehicle-outboard direction away from the rocker 18 by the second distance. In such an example, the first distance is greater than the second distance. In other words, the step bar 20 extends upwardly farther than the step bar 20 extends in the vehicle-outboard direction.

The step bar 20 defines a class-A surface 44. A class-A surface 44 is a finished surface exposed to view by a customer and free of unaesthetic blemishes and defects. In other words, the class-A surface 44 is a surface specifically manufactured to have a high quality, finished aesthetic appearance free of blemishes. The class-A surface 44 may be opposite the stepping surface 40. In other words, the class-A surface 44 faces an opposite direction from the stepping surface 40. In the raised position, the class-A surface 44 faces the vehicle-outboard direction in the raised position, i.e., the stepping surface 40 faces the vehicle-inboard direction and the class-A surface 44 faces the vehicle-outboard direction. In the lowered position, the class-A surface 44 may face downwardly, i.e., the stepping surface 40 faces upwardly and the class-A surface 44 faces downwardly.

With reference to FIGS. 3A and 3B, the vehicle 10 may include a pin 46 fixed to the step bar 20. The pin 46 may be fixed at either the first end 22 of the step bar 20 or the second end 24 of the step bar 20. In examples such as shown in the Figures, the step bar 20 may include two pins 46, e.g., a first pin 46 and a second pin 46, spaced from each other along the vehicle-longitudinal axis. Specifically, the first pin 46 and the second pin 46 may be spaced by the stepping surface 40 along the vehicle-longitudinal axis. In other words, the stepping surface 40 is between the first pin 46 and the second pin 46. The first pin 46 may be fixed to the step bar 20 at the first end 22 of the step bar 20 and the second pin 46 may be fixed at the second end 24 of the step bar 20. In other words, the first pin 46 may be aligned with the front pillar 14, e.g., the A-pillar 14, and the second pin 46 may be aligned with the rear pillar 16, e.g., the C-pillar 16. The step bar 20 may include any suitable number of pins 46.

Figure 4B:
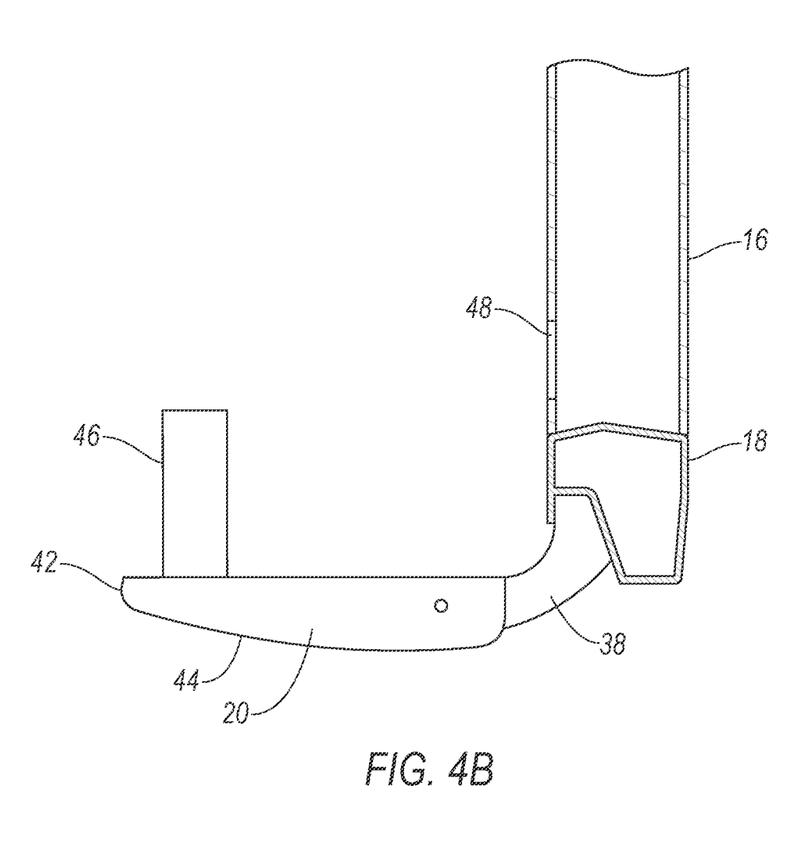
FIG. 4B is a cross-sectional view through line 4B of FIG. 2.

With reference to FIGS. 2 and 4B, in the lowered position, the pins 46 may extend upwardly from the step bar 20. With reference to FIG. 4A, in the raised position, the pin 46 may extend in the vehicle-inboard direction.

The pins 46 may be engageable with the vehicle body 12 in the raised position. Specifically, the pins 46 may be engageable with one of the front pillar 14 or the rear pillar 16. For example, the first pin 46 may be engageable with the front pillar 14 and the second pin 46 may be engageable with the rear pillar 16 in the raised position. In such an example, the vehicle body 12, e.g., the front pillar 14 and the rear pillar 16, may include a hole 48 that receives the pin 46 when the step bar 20 is in the raised position. In other words, as discussed above, the pins 46 extend in the vehicle-inboard direction into the holes 48 in the front pillar 14 and the rear pillar 16.

As the step bar 20 moves from the raised position to the lowered position, the pins 46 disengage from the vehicle body 12, i.e., the front pillar 14 and the rear pillar 16. The pins 46 remove from the holes 48 as in the vehicle body 12 as the step bar 20 moves from the raised position to the lowered position. In the event of an impact to the vehicle 10, e.g., a side impact to the vehicle 10, the pins 46 may provide structure to the step bar 20 by supporting the step bar 20 along the rocker 18.

The numerical adverbs "first" and "second" with respect to the pins 46 are used herein merely as identifiers and do not signify order or importance. The terms "first" and "second" may be used interchangeably when referring to the pins 46 as shown in the Figures.

The step bar 20 may be any suitable material to provide structure to the vehicle 10 in the event of an impact. For example, the step bar 20 may be metal, e.g., aluminum or steel. In other examples, the step bar 20 may be composite material, e.g., a polymer composite.

The vehicle 10 may include two step bars 20, i.e., the vehicle 10 may include a step bar 20 on both sides of the vehicle 10 if the vehicle 10 includes doors 36 on both sides of the vehicle 10. The vehicle 10 may include any suitable number of step bars 20 adjacent the doors 36 slidably supported by the vehicle body 12. In the event of an impact to the vehicle 10, e.g., a side impact, the step bar 20 on the side of the impact may become immobile due to deformation of the step and the vehicle body 12. In such an event, the step bar 20 on the other side of the vehicle 10 may rotate to the lowered position to allow the doors 36 to move to the open position to allow occupants of the vehicle 10 to exit the vehicle 10.

With reference to FIG. 4, the vehicle 10 may include a step bar motor 50 between the step bar 20 and the vehicle body 12. The step bar motor 50 may rotate the step bar 20 relative to the rocker 18 from raised position to the lowered position and from the lowered position to the raised position. In some examples, e.g., examples where the step bar 20 is connected to the rocker 18 by the arms 38, the step bar motor 50 may be between the step bar 20 and at least one of the arms 38. In other examples, e.g., examples where the step bar 20 is connected directly to the rocker 18, the step bar motor 50 may be between the step bar 20 and the rocker 18. In examples wherein the vehicle 10 includes more than one step bar 20, the vehicle 10 may include a second step bar motor 50 corresponding to a second step bar 20. The vehicle 10 may include any suitable number of step bar motors 50 to move the step bar 20 or step bars 20 between the raised position and the lowered position.

The vehicle 10 may include a door motor 52. The door motor 52 may be connected to one or more of the doors 36, e.g., through the track along which the doors 36 slide, to move the doors 36 between the closed position and the open position. In some examples, the vehicle 10 may allow an occupant input, e.g., a button, screen option, etc., to open the doors 36. In such an example, when an occupant activates the screen input, the door motor 52 may be activated and the doors 36 may move to the open position or to the closed position. In other examples, the doors 36 may move automatically to the open position or closed position based on other inputs from the vehicle 10, e.g., when the vehicle 10 is parked, in motion, arrived at a planned destination, etc.

The vehicle 10 may include at least one impact sensor 54 for sensing impact of the vehicle 10. The impact sensor 54 is configured to detect an impact to the vehicle 10. The impact sensor 54 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 54 may be located at numerous points in or on the vehicle 10.

With continued reference to FIG. 4, the vehicle 10 includes a computer 56 that includes a processor and a memory such as are known. The memory includes one or more forms of computer readable media, and stores instructions executable by the computer 56 for performing various operations, including as disclosed herein. The computer 56 may include programming to operate one or more of vehicle brakes, propulsion (e.g., control of acceleration in the vehicle 10 by controlling one or more of an internal combustion engine, electric motor, hybrid engine, etc.), steering, climate control, interior and/or exterior lights, etc., as well as to determine whether and when the computer 56, as opposed to a human operator, is to control such operations. Additionally, the computer 56 may be programmed to determine whether and when a human operator is to control such operations. The computer 56 may be in communication with the impact sensors 54, the step bar motor 50, and the door motor 52.

The computer 56 may include or be communicatively coupled to, e.g., via a vehicle network such as a communications bus as described further below, more than one processor, e.g., included in components such as sensors, electronic controller units (ECUs) or the like included in the vehicle 10 for monitoring and/or controlling various vehicle components, e.g., a powertrain controller, a brake controller, a steering controller, etc.

Figure 5:
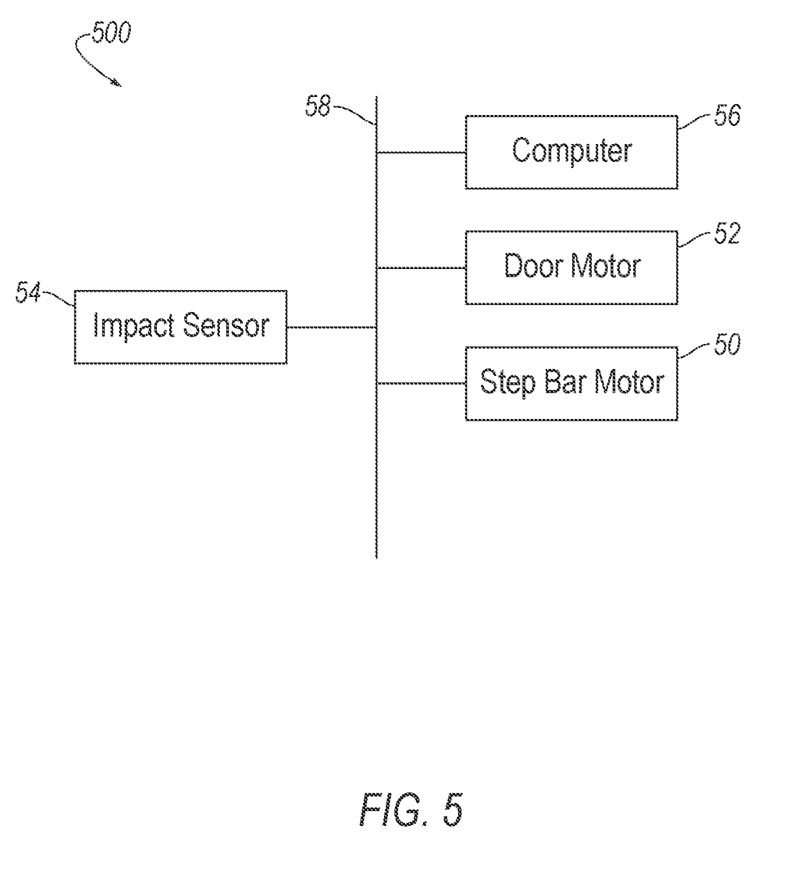
FIG. 5 is a block diagram of a vehicle communication network of the vehicle.

With continued reference to FIG. 5, the computer 56 is generally arranged for communications on a vehicle communication network 58 that can include a bus in the vehicle 10 such as a controller area network (CAN) or the like, and/or other wired and/or wireless mechanisms. Via the vehicle network, the computer 56 may transmit messages to various devices in the vehicle 10 and/or receive messages (e.g., CAN messages) from the various devices, e.g., sensors, an actuator, a human machine interface (HMI), etc. Alternatively or additionally, in cases where the computer 56 actually comprises a plurality of devices, the vehicle communication network 58 may be used for communications between devices represented as the computer 56 in this disclosure. Further, as mentioned below, various controllers and/or sensors may provide data to the computer 56 via the vehicle communication network 58.

Figure 6:
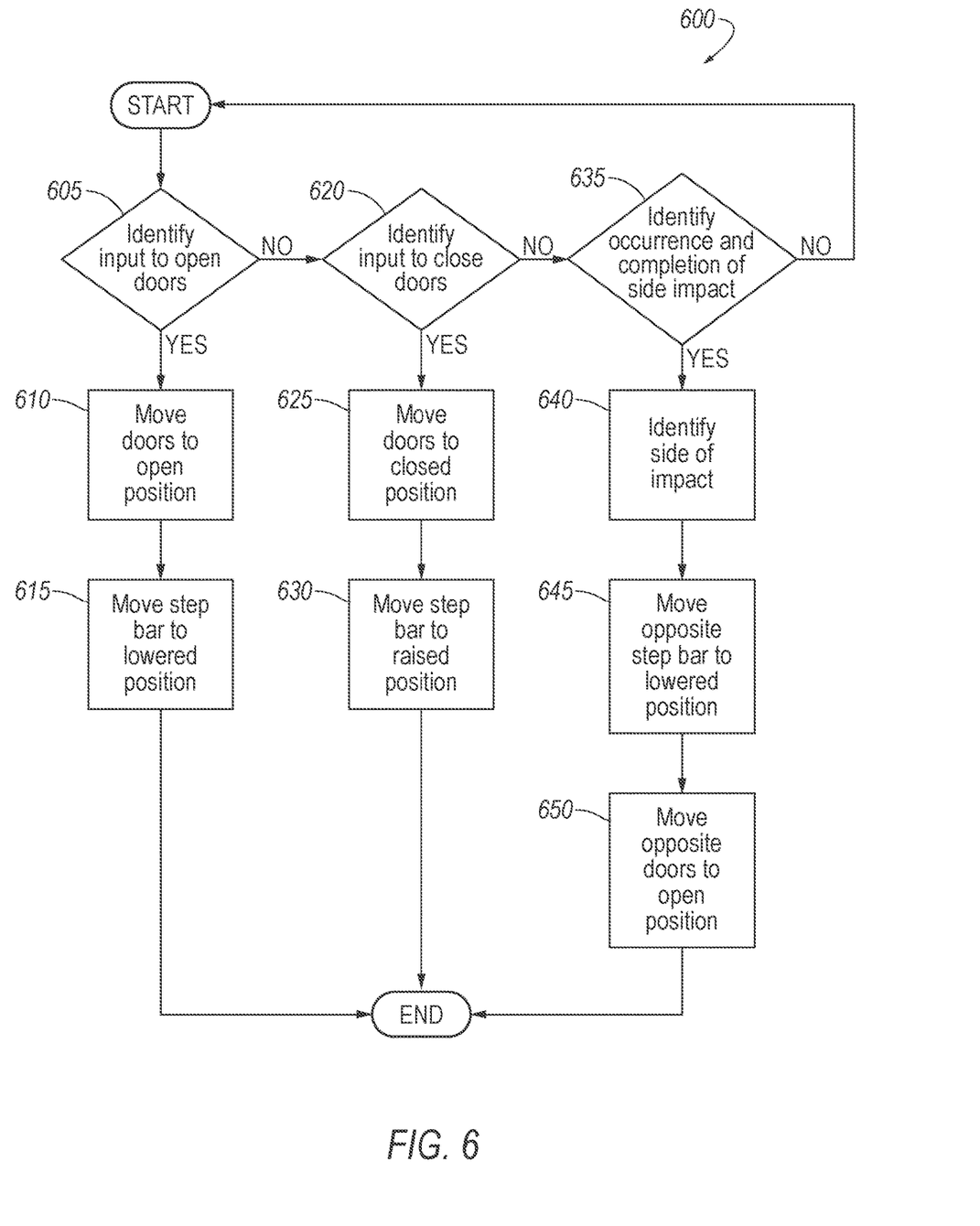
FIG. 6 is a flow chart of a method for moving the step bar between the raised position and the lowered position and the doors between the open position and closed position.

With reference to FIG. 6, the computer 56 stores instructions to control components of the vehicle 10 according to the method 600. Specifically, as shown in FIG. 6, the computer 56 may control the conditions under which the doors 36 may move to the open position or the closed position and the step bar 20 may move to the lowered position or raised position.

With reference to decision block 605, the method includes instructions to identify an input to move the doors 36 to the open position. The input may be an occupant input into the computer 56 or could be an automatic input to move the doors 36 to the open position. If the input is not to move the doors 36 to the open position, the method moves to decision block 620.

With reference to block 610, upon identifying the input is to move the doors 36 to the open position, the method includes instructions to move the doors 36 to the open position. The computer 56 may send a signal to the door motor 52 to move the door 36 from the closed position to the open position.

With reference to block 615, the method includes instructions to move the step bar 20 from the raised position to the lowered position when the door 36 moves to the open position. After the door motor 52 moves the doors 36 to the open position, the computer 56 may send a signal to the step bar motor 50 to move the step bar 20 to the lowered position.

With reference to decision block 620, the method may include instructions to identify an input to move the doors 36 to the closed position. The input may be an occupant input into the computer 56 or could be an automatic input to move the doors 36 to the closed position. If the input is not to move the doors 36 to the closed position, the method moves to decision block 635.

With reference to block 625, upon identifying the input to move the doors 36 to the closed position, the method includes instructions to move the doors 36 to the closed position. The computer 56 may send a signal to the door motor 52 to move the door 36 from the open position to the closed position.

With reference to block 630, upon identifying the input is to move the doors 36 to the closed position, instructions include to move the step bar 20 from the lowered position to the raised position when the door 36 moves to the closed position.

With reference to decision block 635, the method may include instructions to identify an occurrence and completion of a side impact to the vehicle 10. The impact sensors 54 may send a signal to the computer 56 to indicate an impact to a side to the vehicle 10 and completion of the impact to the side of the vehicle 10, i.e., identify that vehicle 10 is no longer in motion due to the impact to the vehicle 10. If no impact is identified, the method returns to the start.

With reference to block 640, upon identifying the impact, the method may include instructions to identify the side of the vehicle 10 involved in the impact. The impact sensors 54 may send a signal to the computer 56 to identify the side of the vehicle 10 involved in the impact.

With reference to block 645, upon identifying the side of the vehicle 10, the method may include instructions to move the step bar 20 from the raised position to the lowered position. In such an event, the computer 56 may send a signal to the step bar motor 50 to move the step bar 20 from the raised position to the lowered position automatically.

With reference to block 650, the method may include instructions to move the doors 36 to the open positions. In such an event, the computer 56 may send a signal to the door motor 52 to move the doors 36 from the closed position to the open position automatically.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle body including a front pillar, a rear pillar spaced from the front pillar, and a rocker extending from the front pillar to the rear pillar;
   a step bar supported by the rocker and extending from a first end aligned with the front pillar to a second end aligned with the rear pillar, the step bar being movable between a raised position and a lowered position;
   the step bar in the raised position overlaps the rocker in a vehicle-outboard direction and extends upwardly above the rocker; and
   a first pin fixed to the step bar and engageable with the vehicle body in the raised position.

2. The vehicle of claim 1, further comprising a first door slidably supported by the vehicle body and movable from an open position to a closed position, the step bar overlapping the first door in the vehicle-outboard direction when the first door is in the closed position and the step bar is in the raised position.

3. The vehicle of claim 2, further comprising a second door slidably supported by the vehicle body adjacent the first door and movable from an open position to a closed position, the step bar overlapping the second door in the vehicle-outboard direction when the first door and the second door are in the closed positions and the step bar is in the raised position.

4. The vehicle of claim 3, wherein the vehicle body defines an opening extending uninterrupted from the front pillar to the rear pillar, the first door and the second door being in the opening in the closed positions.

5. The vehicle of claim 2, further comprising a computer including a processor and memory storing instructions executable by the processor to move the step bar from the raised position to the lowered position when the first door moves to the open position.

6. The vehicle of claim 5, wherein the memory stores instructions executable by the processor to move the step bar from the lowered position to the raised position when the first door moves to the closed position.

7. The vehicle of claim 2, further comprising a computer including a processor and memory storing instructions executable by the processor to move the step bar from the lowered position to the raised position when the first door moves to the closed position.

8. The vehicle of claim 1, wherein the first pin is engageable with one of the front pillar or the rear pillar.

9. The vehicle of claim 1, wherein the first pin extends in a vehicle-inboard direction from the step bar in the raised position and the first pin extends upwardly from the step bar in the lowered position.

10. The vehicle of claim 1, further comprising a second pin fixed to the step bar, the first pin being fixed at the first end of the step bar and the second pin being fixed at the second end of the step bar, and the first pin being engageable with the front pillar and the second pin being engageable with the rear pillar in the raised position.

11. The vehicle of claim 1, wherein the step bar includes a stepping surface facing upwardly when the step bar is in the lowered position and facing vehicle-inboard when the step bar is in the raised position.

12. The vehicle of claim 11, wherein the step bar defines a class-A surface opposite the stepping surface, the class-A surface facing the vehicle-outboard direction in the raised position.

13. The vehicle of claim 1, further comprising an arm extending from the step bar to the rocker, the arm being rotatably coupled to at least one of the rocker and the step bar.

14. The vehicle of claim 1, wherein the step bar is rotatable relative to the rocker from the raised position to the lowered position.

15. The vehicle of claim 1, wherein the step bar is elongated along a vehicle-longitudinal axis.

16. The vehicle of claim 1, wherein the step bar extends vertically a first distance in the raised position and in the vehicle-outboard direction a second distance in the raised position, the first distance being greater than the second distance.

17. The vehicle of claim 1, wherein the vehicle body defines an opening extending uninterrupted from the front pillar to the rear pillar.

18. The vehicle of claim 1, wherein the vehicle body defines a hole at one of the front pillar or the rear pillar, the first pin being engageable with the hole in the raised position.

19. The vehicle of claim 10, wherein the vehicle body defines a first hole at the front pillar and a second hole at the rear pillar, the first pin being engageable with the first hole in the raised position and the second pin being engaged with the second hole in the raised position.

20. The vehicle of claim 11, wherein the first pin is fixed to the stepping surface of the step bar.

\* \* \* \* \*